United States Patent [19]

Tanaka et al.

[11] 4,232,229
[45] Nov. 4, 1980

[54] OZONIZER

[75] Inventors: Masaaki Tanaka; Takanori Ueno; Norikazu Tabata, all of Amagasaki, Japan

[73] Assignee: Mitsubishi Denki Kabushiki Kaisha, Tokyo, Japan

[21] Appl. No.: 10,683

[22] Filed: Feb. 9, 1979

[30] Foreign Application Priority Data

Feb. 13, 1978 [JP] Japan .................................. 53-15129
Jun. 20, 1978 [JP] Japan .................................. 53-74538

[51] Int. Cl.³ ............................................. C01B 13/12
[52] U.S. Cl. .................................. 250/541; 250/539; 250/540
[58] Field of Search ................. 250/532, 539, 540, 541

[56] References Cited

U.S. PATENT DOCUMENTS

| 788,557 | 5/1905 | Sahlstrom | 250/539 |
| 1,010,777 | 12/1911 | Leggett | 250/539 |
| 1,062,974 | 5/1913 | Hopkins | 250/540 |
| 2,128,455 | 8/1938 | Darling | 250/532 |
| 2,429,152 | 10/1947 | Allison | 250/541 |
| 3,214,364 | 10/1965 | Van Tuyle et al. | 250/540 |
| 3,421,999 | 1/1969 | Corwin | 250/540 |
| 3,899,685 | 8/1975 | Francis et al. | 250/540 |
| 4,025,441 | 5/1977 | Tabata et al. | 250/540 |

FOREIGN PATENT DOCUMENTS 939825  5/1948  France ..................................... 250/532

OTHER PUBLICATIONS

Tabata, N., "High Frequency Ozonizer . . . ", *2nd Int'l. Symposium on Ozone Technology*, May, 1975, p. 120.
Tabata, N., "High Power Density Ozonizer", *3rd Int'l. Symposium on Ozone Technology*, May, 1977, p. 1.

*Primary Examiner*—Deborah L. Kyle
*Attorney, Agent, or Firm*—Oblon, Fisher, Spivak, McClelland & Maier

[57] ABSTRACT

An ozonizer comprising a pair of electrodes including a grounding electrode and a high voltage electrode, a dielectric substrate disposed between the grounding electrode and the high voltage electrode, a perforated metal substrate disposed in a gap space between the grounding electrode and the dielectric substrate, wherein the perforated metal substrate comprises first spacing means interspaced between the perforated metal substrate and the dielectric substrate for maintaining a constant separation gap therebetween, second spacing means disposed between the perforated metal substrate and the grounding electrode to maintain the perforated metal substrate in position between the dielectric substrate and the grounding electrode, wherein a uniform separation distance promoting a uniform silent discharge is maintained between the perforated metal substrate and the dielectric substrate by the first and second spacing means.

12 Claims, 8 Drawing Figures

OZONIZER

BACKGROUND OF THE INVENTION

1. Field of the Invention

The present invention relates to an ozonizer for generating ozone by a silent discharge caused by applying AC high voltage. More particularly, it relates to an ozonizer wherein an ozone generating efficiency is highly improved by minimizing a discharging gap between a ground electrode and a high voltage electrode tube.

2. Description of the Prior Arts

FIG. 1 shows the conventional coaxial cylindrical type ozonizer wherein the reference numeral (1) designates a cylindrical casing which comprises a grounding metal tube (2) having a jacket having a cooling water inlet (9) and a cooling water outlet (10) and an inlet 11 of a raw material gas such as air or oxygen and an outlet of an ozonized gas (12); (4) designates a high voltage electrode tube made of a dielectric material such as glass which is coaxially disposed in the grounding metal tube (2) by means of a plurality of spacers (13) to form a specific discharging gap space (3); (5) designates an electric conductive film formed on an inner surface of the electrode tube; and (6) designates a feeder for applying AC high voltage from a feeding line (7) through a bushing (8) to the electric conductive film (5). Many pairs of the grounding metal tubes (2) and the high voltage electrode tubes (4) are disposed in the cylindrical casing (1) depending upon the required ozone generating capacity.

When the AC high voltage is applied to the high voltage electrode tube (4) in the conventional ozonizer, a silent discharge or mild glow discharge is formed in the discharging gap space (3) whereby the raw material gas fed into the tube is ozonized.

The ozone generating efficiency $\eta$ is given by the equation $$\eta = Y_{O_3}/W$$

wherein W represents a discharge power and $Y_{O_3}$ represents an ozone generating rate. The ozone generating efficiency $\eta$ is increased by reducing the discharging gap space (3). When the discharging gap distance d is reduced, the probability by dissociating an oxygen molecule of electrons is increased whereby "a discharging effect" for generating effectively ozone is improved. The decomposition of ozone is controlled by improving the cooling effect in the discharging gap space (3) whereby "a cooling effect" for effectively producing ozone is improved.

Recently, it has been required to reduce the cost of an ozonizer and the operating cost thereof depending upon an increase of a capacity of the ozonizer. In order to reduce the operating cost, that is to improve the ozone generating efficiency $\eta$, it is necessary to reduce the discharging gap distance as described.

In order to reduce the discharging gap distance, it has been required to use the dielectric tube and the metal grounding electrode having higher accuracy and accordingly, an expensive ozonizer is required. Accordingly, in the conventional ozonizer, the discharging gap distance has been usually several millimeters from the viewpoint of the cost of the ozonizer, and a further improvement for improving the ozone generating efficiency $\eta$ has been required.

SUMMARY OF THE INVENTION

It is an object of the present invention to provide an ozonizer which has an improved discharging effect as one means for improving the ozone generating efficiency from the above mentioned viewpoint.

The present invention is to provide an ozonizer which comprises a perforated metal substrate in a gap space between a grounding electrode and a high voltage electrode to reduce a discharging gap distance d between the grounding electrode and a dielectric substrate whereby the ozone generating efficiency is increased without improving a size accuracy and an economical ozonizer having improved operating characteristics can be easily obtained since high size accuracy is not required.

In accordance with the present invention, a perforated metal substrate is disposed in the gap space between the grounding electrode and the dielectric substrate whereby a gas can flow and be diffused by passing through pores in the perforated metal substrate even though the discharging gap space is separated by the perforated metal substrate and a distribution of ozone concentration in the gas and a distribution of temperature can be uniform.

In the other embodiment of the present invention, a heat conductive substrate is disposed in a gap space between the perforated metal substrate and the grounding electrode to improve a transfer of heat caused by discharging in the gap space between the perforated metal substrate and the grounding electrode whereby a reduction of an ozone generating efficiency is prevented. The effect of the heat conductive substrate is especially remarkable in case of high discharge power. By provision of the heat conductive substrate, most of the raw material gas is passed through the discharging gap space, whereby the gas flow rate is increased and the ozone generating efficiency is further improved.

A more complete appreciation of the invention and many of the attendant advantages thereof will be readily obtained as the same becomes better understood by reference to the following detailed description when considered in connection with the accompanying drawings, wherein:

DETAILED DESCRIPTION OF THE PREFERRED EMBODIMENT

Figure 1:
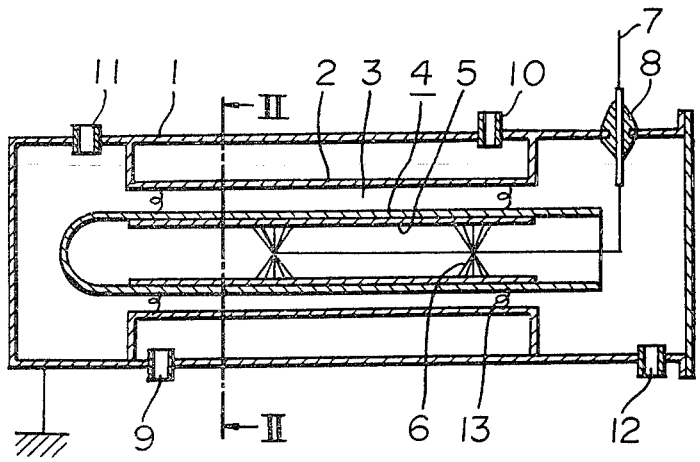
FIG. 1 is a vertical sectional view of the conventional ozonizer.
Figure 2:
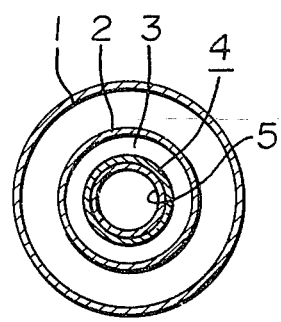
FIG. 2 is a sectional view taken along the line (II)—(II) of FIG. 1.
Figure 3:
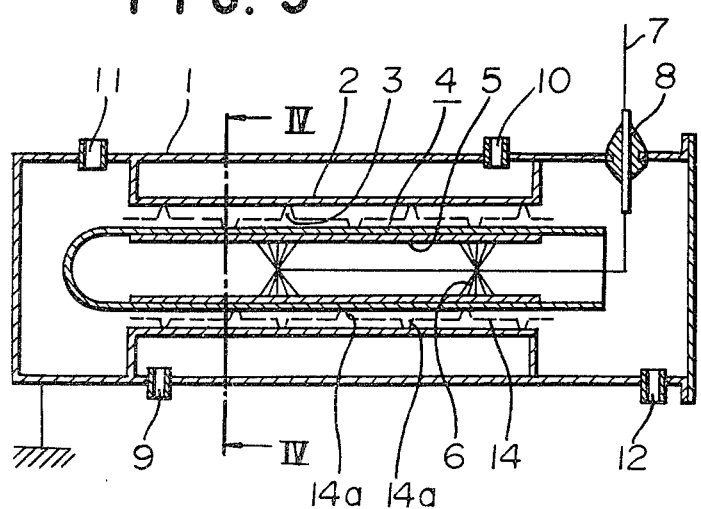
FIG. 3 is a vertical sectional view of one embodiment of the present invention.
Figure 4:
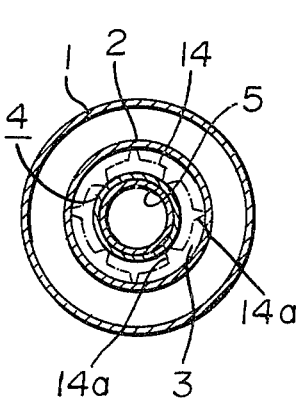
FIG. 4 is a sectional view taken along the line (IV)—(IV) of FIG. 3.

Referring now to FIGS. 3 and 4 which show one embodiment of the present invention wherein the same reference numerals designate identical or corresponding parts the description of which are not again repeated, the reference numeral (14) designates a perforated metal tube such as a wire net which is disposed in the middle of the annular discharging gap space (3) between the grounding metal tube (2) and the high voltage electrode tube (4). Many projects (14a) are formed on the inner surface and the outer surface of the perforated metal tube. The projects (14a) of the perforated metal tube (14) are contacted with the inner surface of the grounding metal tube (2) and the outer surface of the high voltage electrode tube (4) such that the perforated metal tube (14) is held in the middle of the discharging gap space (3).

The perforated metal tube (14) can be other than a wire net, and can be a porous metal plate which has many pores through which the raw material gas or the ozonized gas can be passed.

The perforated metal tube (14) is preferably soft rather than hard since even though the discharging gap space is not uniform due to the eccentric disposition of the earthing metal tube (2) and the high voltage electrode tube (4), the soft type perforated metal tube (14) is easily deformed depending upon any eccentrical deformation.

When the projects (14a) on the surface of the earthing electrode are deformed easier than that of the high voltage electrode, even though the discharging gap space between the grounding metal tube (2) and the high voltage electrode (4) is non-uniform, the non-uniformity is compensated by the deformation of the projects (14a) in the grounding electrode side, whereby the discharging gap space between the perforated metal tube (14) and the high voltage electrode (4) can be maintained uniform by the harder projects (14a) in the high voltage electrode side upon deformation of the softer projects (14a) on the grounding electrode side.

The perforated metal tube (14) is electrically contacted with the grounding electrode tube (2) whereby they are at equal potential and a silent discharge (15) (FIG. 5) is formed between the perforated metal tube (14) and the high voltage electrode (4), and the effective discharging gap is depending upon the height of the projects (14a) of the perforated metal tube (14) especially the projects in the high voltage electrode side. It is possible to prepare an ozonizer having about 0.5 mm of the effective discharging gap distance and the discharging gap distance d can be minimized and the "discharging effect" can be attained.

Figure 5:
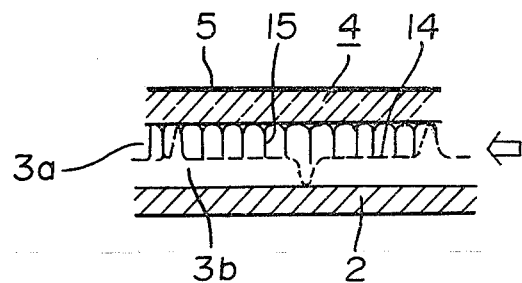
FIG. 5 is an enlarged sectional view of a discharging gap.

As shown in FIG. 5, the raw material gas is fed in the direction of the arrow upon dividing into spaces (3a), (3b) on opposite sides of the perforated metal tube (14). Thus, the perforated metal tube has many pores whereby the raw material gas is mutually diffused through the pores and the distribution of ozone concentrations and the distribution of temperatures are substantially the same with those of non-use of the perforated metal tube (14).

Figure 6:
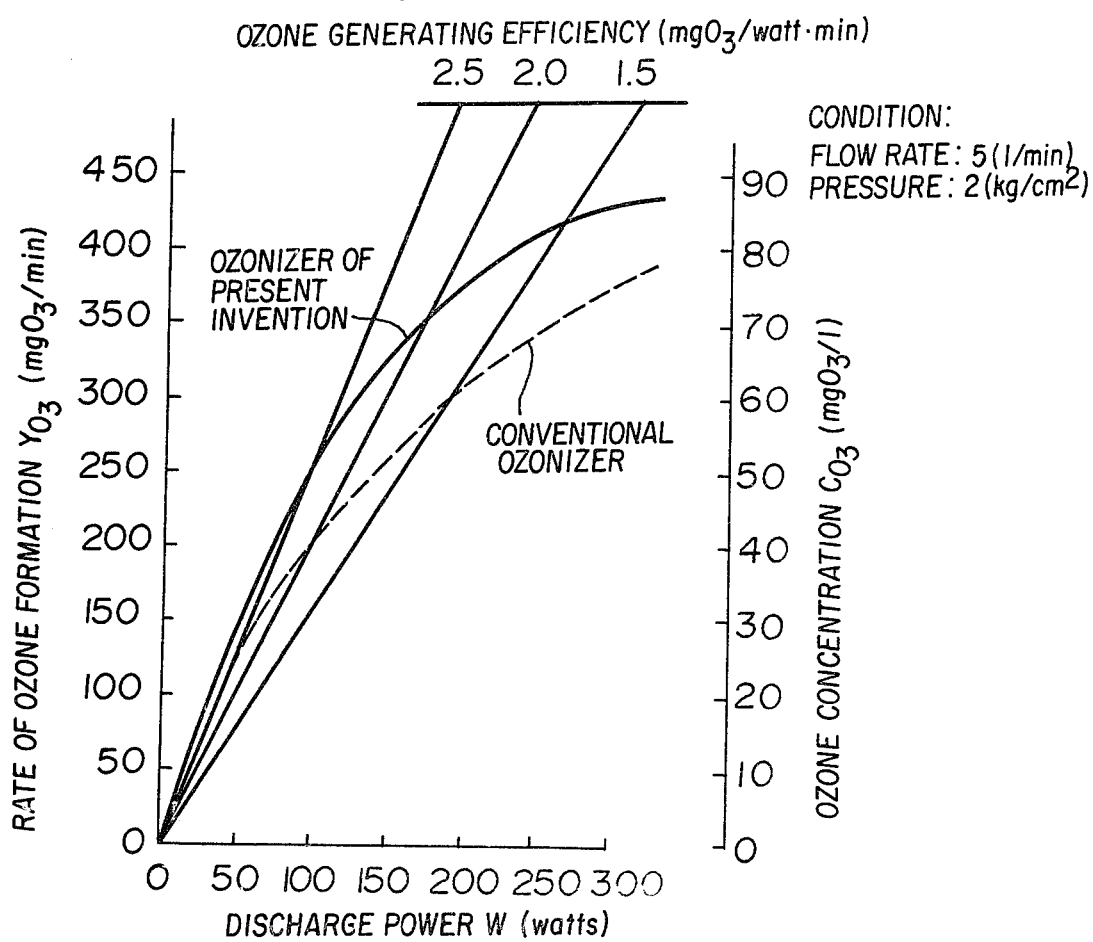
FIG. 6 is a characteristic graph showing a relation between discharge power and rate of ozone generation.

FIG. 6 is a characteristic graph prepared by experimental data obtained by comparing relations of discharge powers W of the conventional ozonizer and the ozonizer of the present invention to the rate of ozone formation $Y_{O3}$. The full line shows the data of the present invention and the dotted line shows the data of the conventional ozonizer.

In these experiments, oxygen gas is used as the raw material gas and the flow rate Q was 5 liter/min. and the ozone concentration $C_{O3}$ is given by $Y_{O3}/QN$ and accordingly, the scale of the ozone concentration $C_{O3}$ is also given in FIG. 6.

As it is clear from FIG. 6, the ozone generating efficiency $\eta$ of the ozonizer of the present invention is improved from 20 to 30% over that of the conventional ozonizer.

The discharging effect is performed only when the discharge power is low to minimize heat generation in the discharging gap space. When the discharge power is large, the discharging effect is reduced in comparison with that of non-metal tube (14), since the gap space between the grounding electrode (2) and the high voltage electrode (4) is divided into the discharging gap space (3a) and the gas space (3b) by the perforated metal tube (14) and the gas space (3b) has little heat conducting means to accomplish a cooling effect in the discharging gap space (3a) or a the high voltage electrode (4) and accordingly, the ozone generating efficiency is lowered. Moreover, the raw material gas flow is divided into the discharging gap space (3a) for forming ozone under the discharge and the gas space (3b) for transferring heat. Thus, the discharging gap distance of the space (3a) is usually 2 to 4 times longer than that of the gas space distance (3b). When the raw material gas flow is high rate, it is not easy to shift the gas from the former space (3a) to the latter space (3b) whereby a distribution of locally high ozone concentration and a distribution of locally high temperature gas are caused to accelerate a decomposition of ozone rather than the formation of ozone to reduce the ozone generating efficiency.

Figure 7:
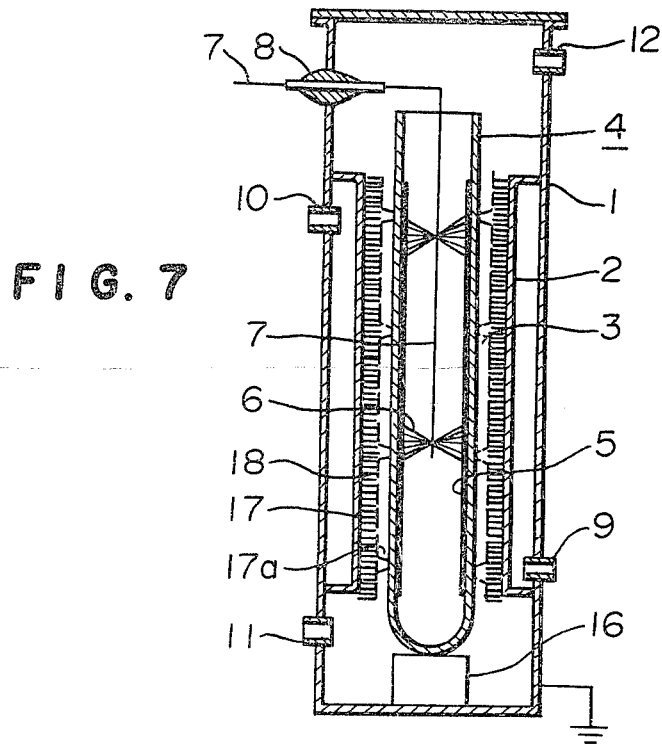
FIG. 7 is a vertical sectional view of the other embodiment of the present invention.

FIG. 7 shows the other embodiment for overcoming said disadvantages.

FIG. 7 shows a vertical ozonizer wherein the reference numeral (16) designates a supporter for the high voltage electrode tube (4), and (17) designates a perforated metal substrate which has projects (17a) for forming the discharging gap space in the high voltage electrode tube side but which has no projects on the grounding electrode side; (18) designates a heat conductive material having elasticity filled in the space between the metal substrate (17) and the grounding electrode (2). Steel wool is usually used.

In principle, the heat conductivity of a metal is about $10^3$ order to that of a gas. Accordingly, even though the steel wool occupies only several percent of the space between electrode 2 and substrate 17, the cooling effect is remarkably improved to improve the ozone generating efficiency. Even though the metal grounding electrode (2) and the high voltage electrode tube (4) have non-uniform diameters, the discharging gap space to the high voltage electrode (4) is uniformly maintained by the projects (17a) and the metal substrate (17) can be pressed under the elasticity of the steel wool. The steel wool reduces the raw material gas flow in the space between the metal substrate (17) and the metal earthing electrode (2) whereby most of the raw material gas passes through the discharging gap space (3) and the flow rate is increased to contribute to the improvement of the ozone generating efficiency.

Figure 8:
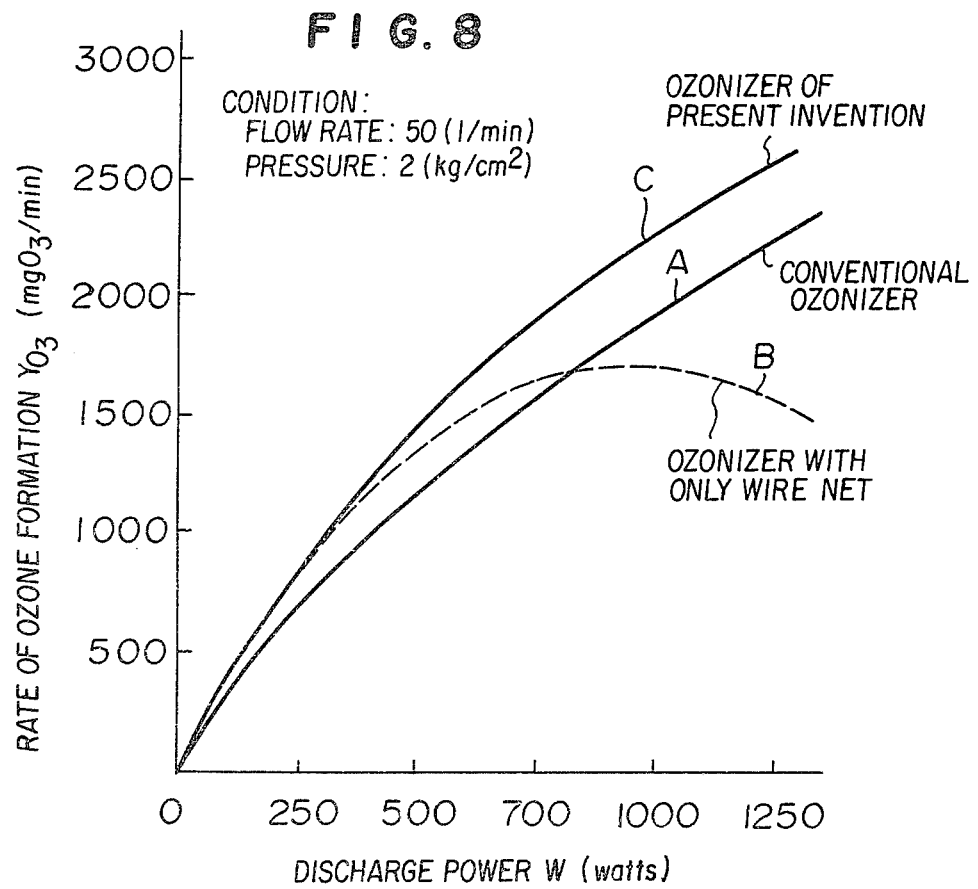
FIG. 8 is a characteristic graph showing the relation between discharge power and rate of ozone generation.

FIG. 8 shows relations of the ozone generating rate $Y_{O3}$ to the discharge power W in the cases of (A) the conventional ozonizer (discharging gap distance d=2 mm), (B) the ozonizer comprising the metal substrate in the discharging gap space (discharging gap distance d=0.5 mm) and (C) the ozonizer comprising the steel wool filled in the space between the metal substrate and the metal grounding electrode (discharging gap distance d=0.5 mm). In the tests, oxygen is used as the raw material gas and a gas flow rate is 50 (lN/min) and an inner pressure in the ozonizer is 2 ($Kg/cm^2$).

As it is clear from FIG. 8, when only the metal substrate (17) is disposed in the discharging gap space, (case (B)), the discharging effect given by reducing the discharging gap is found in the lower discharge power W to increase the ozone generating efficiency $\eta$ for 15 to 20%, however the cooling effect is deteriorated in the higher discharge power W to reduce remarkably the ozone generating efficiency in comparison with that of the conventional ozonizer.

However, in the ozonizer comprising the steel wool filled in the space between the metal substrate and the metal earthing electrode (case (C)), the reduction of the ozone generating efficiency $\eta$ caused by the deterioration of the cooling effect is overcome and the ozone generating efficiency $\eta$ is about ten and several percent higher than that of the conventional ozonizer even though the discharge power W is high.

In this embodiment, the steel wool is used as the heat conductive material. Thus, any medium having high heat conductivity can be used in stead of the steel wool.

In the embodiment shown in FIG. 3, a perforated metal tube (14) is disposed along the entire length of the discharging gap space (3), however, it can be disposed in only a partial length of the discharging gap space.

As it is clear from the characteristic graph of FIG. 6, the effect of the perforated metal tube (14) is higher depending upon higher ozone concentration $C_{O3}$. Accordingly, even though the perforated metal tube (14) is disposed in only a down stream part of the discharging gap space (3), high effect can be expected.

In the embodiments, the perforated metal tube (14) having many projects (14a) is used. Thus, the projects (14a) can be replaced by any shape holding means for holding the perforated metal tube (14) in the discharging gap space (3). The embodiments show the coaxial cylindrical ozonizers. Thus, the same effect can be expected in the case of a flat plate type ozonizer.

Obviously, numerous modifications and variations of the present invention are possible in light of the above teachings. It is therefore to be understood that within the scope of the appended claims, the invention may be practiced otherwise than as specifically described herein.

What is claimed is:
1. An ozonizer comprising:
   a pair of electrodes including a grounding electrode and a high voltage electrode;
   a dielectric substrate disposed between said grounding electrode and said high voltage electrode;
   a perforated metal substrate disposed in a gap space between said grounding electrode and said dielectric substrate and being in electrical contact with said grounding electrode, said perforated metal substrate comprising,
   first spacing means interspaced between said perforated metal substrate and said dielectric substrate for maintaining a constant separation gap therebetween,
   second spacing means disposed between said perforated metal substrate and said grounding electrode to maintain said perforated metal substrate in position between said dielectric substrate and said grounding electrode,
   wherein a uniform separation distance promoting a uniform silent discharge is maintained between said perforated metal substrate and said dielectric substrate by said first and second spacing means.

2. An ozonizer according to claim 1 wherein said perforated metal substrate is disposed along the entire length of the gap space between said grounding electrode and said dielectric substrate.

3. An ozonizer according to claim 1 wherein said perforated metal substrate is disposed along a partial length of the gap space between said grounding electrode and said dielectric substrate.

4. An ozonizer according to claim 3 wherein said perforated metal substrate is disposed down stream to a raw material gas flow in the gap space between said grounding electrode and said dielectric substrate.

5. An ozonizer according to claim 1 wherein said first spacing means and said second spacing means comprises plural projections from both sides of said perforated metal substrate contacting said grounding electrode and said dielectric substrate.

6. An ozonizer according to claim 5 wherein said projections are formed integrally with said perforated metal substrate.

7. An ozonizer according to claim 1 wherein said perforated metal substrate is made of an elastic substance.

8. An ozonizer according to claim 1 wherein said perforated metal substrate is a wire net.

9. An ozonizer according to claim 1 wherein said second spacing means comprises:
   a heat conductive material disposed in the gap space between said perforated metal substrate and said grounding electrode.

10. An ozonizer according to claim 9 wherein said first spacing means are formed by plural projections from said perforated metal substrate for maintaining uniform gap space between said metal substrate and said dielectric substrate.

11. An ozonizer according to claim 9 wherein said heat conductive material is an elastic material.

12. An ozonizer according to claim 9 wherein said heat conductive material is a steel wool.

* * * * *